(12) United States Patent
Tadayon et al.

(10) Patent No.: US 7,411,337 B2
(45) Date of Patent: Aug. 12, 2008

(54) ELECTRICAL ENERGY-GENERATING SYSTEM AND DEVICES AND METHODS RELATED THERETO

(75) Inventors: Pooya Tadayon, Hillsboro, OR (US); Koorosh Zaerpoor, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 763 days.

(21) Appl. No.: 10/880,989

(22) Filed: Jun. 30, 2004

(65) Prior Publication Data

US 2005/0029903 A1    Feb. 10, 2005

Related U.S. Application Data

(63) Continuation-in-part of application No. 10/458,570, filed on Jun. 9, 2003, now Pat. No. 6,877,318, which is a continuation of application No. 09/991,110, filed on Nov. 16, 2001, now Pat. No. 6,574,963.

(51) Int. Cl.
*H01L 41/08*    (2006.01)

(52) U.S. Cl. ............ 310/339; 310/341; 310/342

(58) Field of Classification Search ............ 310/322, 310/338, 339
See application file for complete search history.

(56) References Cited

U.S. PATENT DOCUMENTS

| | | | |
|---|---|---|---|
| 3,639,788 A * | 2/1972 | Horan | ............ 310/319 |
| 4,069,672 A | 1/1978 | Milling | |
| 4,165,607 A | 8/1979 | Fedorowicz et al. | |
| 4,679,118 A | 7/1987 | Johnson et al. | |
| 4,853,762 A | 8/1989 | Ewer et al. | |
| 4,869,250 A | 9/1989 | Bitterly | |
| 4,916,523 A | 4/1990 | Sokolovsky et al. | |
| 5,055,733 A * | 10/1991 | Eylman | ............ 310/328 |
| 5,073,116 A | 12/1991 | Beck, Jr. | |
| 5,097,387 A | 3/1992 | Griffith | |
| 5,163,551 A | 11/1992 | Bhatia | |
| 5,176,000 A | 1/1993 | Dauksis | |
| 5,282,111 A | 1/1994 | Hopfer | |
| 5,319,938 A | 6/1994 | Lucas | |
| 5,329,426 A | 7/1994 | Villani | |
| 5,331,510 A | 7/1994 | Ouchi et al. | |
| 5,343,358 A | 8/1994 | Hilbrink | |
| 5,357,404 A | 10/1994 | Bright et al. | |
| 5,357,757 A | 10/1994 | Lucas | |
| 5,435,152 A | 7/1995 | McCausland | |
| 5,491,981 A | 2/1996 | Kim | |
| 5,515,684 A | 5/1996 | Lucas et al. | |

(Continued)

FOREIGN PATENT DOCUMENTS

JP    07-113840    5/1995

OTHER PUBLICATIONS

U.S. Appl. No. 09/583,802, filed May 31, 2000, Intergrated Circuit Refrigeration Device.

(Continued)

*Primary Examiner*—Mark Budd
(74) *Attorney, Agent, or Firm*—Schwegman, Lundberg & Woessner, P.A.

(57) ABSTRACT

An electrical energy-generating heat sink system provides a convenient and economical method for continuously recharging an energy storage device in electronic devices.

51 Claims, 10 Drawing Sheets

U.S. PATENT DOCUMENTS

| | | | |
|---|---|---|---|
| 5,549,155 | A | 8/1996 | Meyer, IV et al. |
| 5,579,399 | A | 11/1996 | Lucas |
| 5,582,242 | A | 12/1996 | Hamburgen et al. |
| 5,594,293 | A * | 1/1997 | Spivak .................. 310/339 |
| 5,602,719 | A | 2/1997 | Kinion |
| 5,621,615 | A | 4/1997 | Dawson et al. |
| 5,642,262 | A | 6/1997 | Terrill et al. |
| 5,699,227 | A | 12/1997 | Kolman et al. |
| 5,801,929 | A | 9/1998 | Cheng |
| 5,802,707 | A | 9/1998 | Brownell et al. |
| 5,804,875 | A | 9/1998 | Remsburg et al. |
| 5,864,478 | A | 1/1999 | McCutchan et al. |
| 5,875,095 | A | 2/1999 | Webb |
| 5,880,524 | A | 3/1999 | Xie |
| 5,892,293 | A | 4/1999 | Lucas |
| 5,903,436 | A | 5/1999 | Brownell et al. |
| 5,949,647 | A | 9/1999 | Kolman et al. |
| 5,949,648 | A | 9/1999 | Liao |
| 5,955,797 | A | 9/1999 | Kim |
| 5,982,297 | A | 11/1999 | Welle |
| 5,982,635 | A | 11/1999 | Menzies et al. |
| 5,990,549 | A | 11/1999 | Chiu et al. |
| 5,994,854 | A | 11/1999 | Lawrenson et al. |
| 6,021,044 | A | 2/2000 | Neville, Jr. et al. |
| 6,046,905 | A | 4/2000 | Nelson et al. |
| 6,052,285 | A | 4/2000 | Hileman |
| 6,058,013 | A | 5/2000 | Christopher et al. |
| 6,065,530 | A | 5/2000 | Austin et al. |
| 6,082,443 | A | 7/2000 | Yamamoto et al. |
| 6,111,750 | A | 8/2000 | Gates |
| 6,119,474 | A | 9/2000 | Augustine et al. |
| 6,125,035 | A | 9/2000 | Hood, III et al. |
| 6,133,631 | A | 10/2000 | Belady |
| 6,163,073 | A | 12/2000 | Patel |
| 6,178,088 | B1 | 1/2001 | Gates |
| 6,197,257 | B1 | 3/2001 | Raskas |
| 6,212,074 | B1 | 4/2001 | Gonsalves et al. |
| 6,226,178 | B1 | 5/2001 | Broder et al. |
| 6,227,287 | B1 | 5/2001 | Tanaka et al. |
| 6,263,959 | B1 | 7/2001 | Ikeda et al. |
| 6,313,987 | B1 | 11/2001 | O'Connor et al. |
| 6,317,322 | B1 | 11/2001 | Ueki et al. |
| 6,321,452 | B1 | 11/2001 | Lin |
| 6,324,592 | B1 | 11/2001 | Hindman |
| 6,328,097 | B1 | 12/2001 | Bookhardt et al. |
| 6,349,035 | B1 | 2/2002 | Koenen |
| 6,367,263 | B1 | 4/2002 | Scott |
| 6,574,963 | B1 | 6/2003 | Tadayon et al. |
| 6,639,799 | B2 | 10/2003 | Prasher et al. |
| 6,661,660 | B2 | 12/2003 | Prasher et al. |
| 6,750,596 | B2 * | 6/2004 | Kim et al. ................. 310/339 |
| 2003/0192314 | A1 | 10/2003 | Tadayon |

OTHER PUBLICATIONS

U.S. Appl. No. 09/746,554, filed Dec. 22, 2000, An Integrated Vapor Chamber Heat Sink and Spreader and an Embedded Direct Heat Pipe Attachment.

U.S. Appl. No. 09/970,954, filed Oct. 4, 2001, An Integrated Vapor Chamber Heat Sink and Spreader and an Embedded Direct Heat Pipe Attachment.

U.S. Appl. No. 09/991,110, filed Nov. 16, 2001, Electrical Energy-Generating Heat Sink System and Method of Using Same to Recharge an Energy Storage Device.

*Thermacore International, Inc.*, http://www.thermacore.com,8 p.

Epstein, A. H., "Micro Turbine Engines for Soldier Power", *Presented at the Defense Science and Technology Seminar—Future Warrior Systems*, (Oct. 2000), 17 p.

Epstein, A. H., et al., "ShirtButton-Sized Gas Turbines: The Engineering Challenges of Micro High Speed Rotating Machinery", *Presented at the 8th International Symposium on Transport Phenomena and Dynamics of Rotating Machinery (ISROMAC-8)*, Honolulu, HI,(Mar. 2000), 11 p.

Epstein, A., et al., "Turbomachinery", http://web.archive.org/web/20020223002038/http://web.mit.edu/aeroastro/www/labs/GTL/research/micro/turbo.html, (archived Feb. 23, 2002) 1 p.

Mehl, D., "Vapor Chamber Heat Sinks Eliminate Hot Spots", *Thermacore, Inc.*, http://www.thermacore.com/pdfs/vapor.pdf,4 p., no date/year provided.

* cited by examiner

ELECTRICAL ENERGY-GENERATING SYSTEM AND DEVICES AND METHODS RELATED THERETO

CROSS-REFERENCE TO RELATED APPLICATIONS

This application is a continuation-in-part of U.S. patent application Ser. No. 10/458,570, filed on Jun. 9, 2003, now U.S. Pat. No. 6,877,318, which is a continuation of U.S. patent application Ser. No. 09/991,110, filed on Nov. 16, 2001, now issued as U.S. Pat. No. 6,574,963.

CROSS-REFERENCES

This application is related to the following U.S. patents which are assigned to the same Assignee as the present application: U.S. patent application Ser. No. 09/583,802, filed on May 31, 2000, now issued as U.S. Pat. No. 6,367,263, entitled "Integrated Circuit Refrigeration Device," hereinafter referred to as "U.S. Pat. No. 6,367,263"; and U.S. patent application Ser. No. 09/746,554, filed on Dec. 22, 2000, now issued as U.S. Pat. No. 6,639,799, entitled "An Integrated Vapor Chamber Heat Sink and Spreader and an Embedded Direct Heat Pipe Attachment," hereinafter referred to as "U.S. Pat. No. 6,639,799."

TECHNICAL FIELD

Embodiments of the invention relate generally to heat sink systems, and in particular, to an electrical energy-generating heat sink system.

BACKGROUND

Electronic devices in use today are requiring ever-increasing amounts of power. Portable energy sources in such devices provide only limited use until the unit is recharged or the energy source is replaced. Typically, recharging can only be performed when the device is not being used (e.g., by placing the energy source or the entire device in a recharging unit) or otherwise requires a hook-up to the power grid or other external energy source, e.g., automobile cigarette lighter.

In the mobile computing environment, one of the primary challenges has been to extend battery life to enable consumers to prolong the use of the device while mobile. In the past, this challenge has typically been met by building low power processors where power consumption is minimized through circuit design and/or power throttling features. However, persistent consumer demand for higher performance renders this approach impractical. For example, recently developed mobile applications use processors requiring 30 watts or more of power to be drawn off over a temperature of about 100° C. Other efforts have focused on extending battery life, although results, to date, have been incremental at best.

For the reasons stated above, there is a need in the art for a simple, yet effective means for extending the life of portable energy sources.

DETAILED DESCRIPTION

Figure 1:
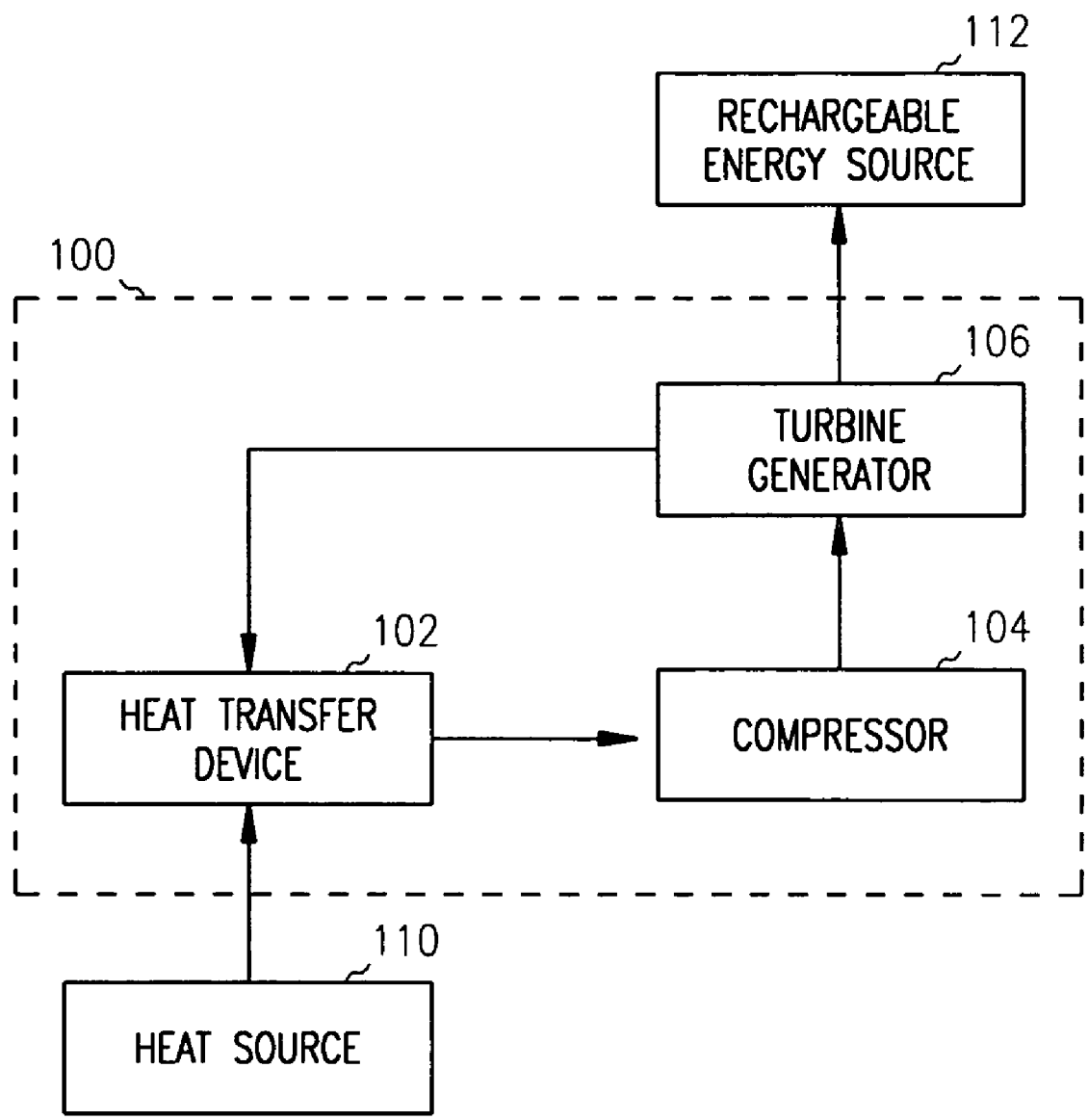
FIG. 1 is a block diagram describing an electrical energy-generating heat sink system in one embodiment of the present invention.

In the following detailed description, reference is made to the accompanying drawings which form a part hereof, and in which is shown by way of illustration specific embodiments in which the inventions may be practiced. In the drawings, like numerals describe substantially similar components throughout the several views. These embodiments are described in sufficient detail to enable those skilled in the art to practice the invention. Other embodiments may be utilized and structural, logical, electrical, and other changes may be made without departing from the spirit and scope of the present invention. The following detailed description is, therefore, not to be taken in a limiting sense, and the scope of the present invention is defined only by the appended claims, along with the full scope of equivalents to which such claims are entitled.

DEFINITIONS

As used herein, the term "working fluid" refers to a multi-phase liquid that can change between a liquid and a vapor at the operating temperatures and pressures of the system it is being used in.

As used herein, the term "heat pipe" refers to a heat transfer device. Heat pipes transfer heat by the evaporation and condensation of a working fluid. A heat pipe is a vacuum tight vessel which is evacuated and partially back-filled with the working fluid. As heat is input to the heat pipe, the fluid is vaporized, creating a pressure gradient within the heat pipe, which forces the vapor to flow. This heated portion is often referred to as the "evaporator portion." In a conventional heat pipe, this flow consists of all the vaporized fluid moving towards the cooler portion of the pipe, i.e., the condenser portion, where it condenses, giving up its latent heat of vaporization. The working fluid is then returned to the evaporator portion. In most instances, this is accomplished with some type of "pump," such as with a mechanical condenser, capillary forces developed in a wick structure, and so forth. Such a pump is needed, as a heat pipe is considered by many to include only devices oriented to work against gravity. (Common usage of the term "heat pipe," however, sometimes includes reference to devices that have no wick structure, such as thermosyphons defined below). A heat pipe can be bent and formed into any number of configurations and is considered to include any type of "vapor spreader" such as a "vapor chamber."

As used herein, the term "vapor chamber heat sink" refers to a vapor chamber in combination with cooling fins, rods and so forth. The vapor chamber base portion of a typical vapor chamber heat sink typically consists of an evaporator, an adiabatic section and a condenser. It is the evaporator or evaporator portion that is placed in contact with the heat-generating device. The vapor chamber in a vapor chamber heat sink may further include a type of pumping means, such as a wick, to provide a return path from the condenser to the evaporator.

As used herein, the term "thermosyphon" refers to a heat transfer device that is gravity aided, having no additional pumping means. A thermosyphon, therefore, technically includes a vapor chamber having no wick structure, although such a chamber is often referred to as a type of heat pipe. Such a vapor chamber is necessarily oriented with the condenser portion located above the evaporator portion.

As used herein, the term "thermal solution" refers to a heat transfer device commonly used to cool a central processing unit (CPU). The term "thermal solution" is sometimes used interchangeably with the term "heat sink," which can include a fan (sometimes referred to as a "fansink").

As used herein, the term "battery" refers to an electrochemical energy storage device or direct-current voltage source that converts chemical, thermal, nuclear or solar energy into electric energy. A battery stores electrical energy using electrochemical cells. Chemical reactions occur spontaneously at the electrodes when connected through an external circuit, producing an electrical current. The physical construction of a battery is such that it does not permit the intermixing and consequent direct reaction of the chemicals stored in it. Although a battery typically consists of several cells coupled in series or parallel, or any combination thereof, a single cell is commonly referred to as a battery.

As used herein, a "rechargeable battery" refers to a battery in which the chemical reaction system providing the electrical current is chemically reversible. After discharging, a rechargeable battery can be recharged by applying an electrical current to its terminals. A rechargeable battery is also referred to as a secondary battery, accumulator battery, storage battery, and so forth. Rechargeable batteries typically used in portable computing devices, such as notebook computers include nickel cadmium, nickel metal hydride and lithium ion batteries.

As used herein, the term "battery charger" refers to a device that provides electrical energy to a rechargeable battery, causing it to recharge. Again, common usage often refers to a battery charger as applying "power" to charge a battery, although this technically refers to the "rate" at which the electrical energy can be supplied. Usually the voltage and current are controlled so the battery is charged rapidly, but without undue stress.

As used herein, the term "charging" refers to a process for "filling" a rechargeable battery with electricity by applying a current to its terminals. The process will cause electrochemical reactions to occur in the battery, storing the electricity in chemical form. (In contrast, during the charging of a capacitor the electricity is stored as electrical charges, without causing any chemical reactions to occur).

As used herein, the term "electrical source" refers to a type of energy source, i.e., a source of electrical current. It can be electrochemical (battery or fuel cell) or an electromechanical device (dynamo) or a specialized electronic instrument. Specialized sources can be called a "voltage source" or a "current source," indicating the characteristic of the electrical power that can be controlled by that device.

As used herein, the term "electrical energy" refers to the ability of an electrical source to carry out useful work or generate heat. For example, this energy can be used to drive an electrical motor and carry out mechanical work, or to generate heat with an electrical heater. Electrical energy is usually expressed in units of watt-hour (Wh).

As used herein, the term "electrical power" refers to the rate at which an electrical source can supply electrical energy. For example, a battery may be able to store a large amount of energy, but if it has a small power capability it can provide the energy (do some work) only slowly, and it will take a long time to discharge. Another battery with the same energy storage capability but larger power will provide the energy (do work) faster, but will also be discharged faster. Electrical power is expressed usually in units of watt (W). The terms "power" and "energy" are often used interchangeably, e.g., "energy source" is often equated with "power source" and such usage may occur herein, although it is to be appreciated that the context in which the term is used provides any necessary clarification. "Loads" are also characterized by a power rating, e.g., an electrical motor or a light bulb is characterized by the power needed to operate it.

As used herein, the term "energy efficiency" refers to a fraction, usually expressed as a percentage of electrical energy stored in a rechargeable battery that is recoverable during discharging. The percentage is dependent on several factors, including current efficiency, heat losses, and so forth.

As used herein, the term "turbine generator" refers to an electric generator that is driven by steam, gas, or hydraulic turbine coupled to it for electric power production. The term "generator" as used herein, refers to a machine by which mechanical energy is changed into electrical energy through use of magnetic fields. If the electrical energy output by the generator is DC, the generator is referred to as a "DC generator." If the electrical energy that is output is an alternating current, the generator is referred to as an "alternator." All generators have a stationary stator and a rotating rotor. The rotating rotor is mounting on bearings so it can rotate, with a rotor shaft sticking out beyond the generator housing. Input to a generator is provided by a "prime mover" which, in this instance, is a "turbine" coupled to the rotor shaft of the generator in order to provide the requisite torque. The term "turbine" as used herein refers to a rotary engine actuated by the reaction or impulse or both of a current of fluid or vaporized fluid subject to pressure. A turbine is typically made with a series of vanes or blades on a central rotating spindle.

As used herein, the term "MEMS" refers to Micro-Electrical Mechanical Systems. MEMS are electrical machine built on silicone using lithography processes and standard silicon manufacturing processes. Examples include MEMS-based turbine engines, turbine-generators, condensers, compressors, and so forth.

DESCRIPTION OF THE EMBODIMENTS

Various embodiments of an electrical energy-generating heat sink system are described herein which provide convenient and economical methods for continuously recharging an energy storage device in electronic devices. In one embodiment, the system includes a refrigeration system in combination with an electricity-generating device. Working fluid in the refrigeration system is vaporized in a heat transfer device and then channeled through a vapor-pressurizing device, such as a compressor or a one-way pressure valve, to produce pressurized vapor. The pressurized vapor then passes through the electricity-generating device, such as a turbine generator or a pressure plate combined with one or more piezoelectric crystals. The electricity-generating device provides electrical energy to the rechargeable energy storage device, such as a notebook battery. Excess vapor is reliquified in the heat transfer device for use again in the system. FIG. 1 shows a simplified block diagram of an electrical energy-generating system 100. In one embodiment, the electrical energy-generating system 100 includes a heat transfer device 102, a compressor 104 and a turbine generator 106. A working fluid present in the heat transfer device 102 is converted to vapor by a heat source 110, such as a microprocessor. The vapor is then directed from the heat transfer device 102 to the compressor 104 where it is pressurized prior to its release into the turbine generator 106. The pressurized vapor causes the blades in the turbine portion of the turbine generator 106 to rotate, producing mechanical energy. This mechanical energy is converted to electrical energy in the generator portion of the turbine generator 106, which is provided to a rechargeable energy source 112, such as a battery. Excess vapor from the turbine generator 106 re-enters the heat transfer device 102, where it is reliquified by cooling for use again in the electrical energy-generating system 100.

Each component of the electrical energy-generating system 100 can be any suitable size and shape, as long as the system fits together properly to perform the intended function. In one embodiment, the electrical energy-generating system is designed to accommodate a range of sizes and types of electronic devices. In yet another embodiment, the electrical energy-generating system is custom designed for any type of unique application. In an exemplary embodiment, the electrical energy-generating system 100 can be used in a laptop computer and is between about five (5) and ten (10) mm thick.

Heat transfer device designs vary, and the various embodiments of the present invention are not limited to any specific design, although space constraints in certain environments, such as the mobile environments, certainly influence the final design. In one embodiment, the heat transfer device comprises a straight hollow tube partially filled with a liquid with the air evacuated from the unfilled volume. The liquid and its vapor within the tube are in equilibrium at the partial pressure of the liquid. The main thermal transfer mechanism with this type of device is the storage and release of the latent heat of vaporization of the liquid. One end of the tube serves as an evaporator while the other end acts as a condenser. Heat applied to the evaporator boils the liquid, converting it to its vapor phase. The heat transferred is the latent heat of liquid vaporization. The vapor enters the condenser, where it condenses by releasing the latent heat of vaporization. The condensed liquid then returns to the evaporator where it is reliquified prior to transfer to the liquid reservoir for use again in the system. In most embodiments, the system operates at less than one (1) atmosphere of pressure. In such embodiments, it is important for air not to leak into the heat transfer device. Otherwise, the fluid would slowly vaporize as it reaches its atmospheric boiling point.

This type of heat transfer device does not have a set thermal conductivity due to the use of two-phase heat transfer. However, it is generally known that the effective thermal conductivity improves with an increase in certain dimensions. Unlike solid materials, the effective thermal conductivity in heat pipes and thermosyphons changes with the amount of energy being transferred as well as with the size of the evaporator and condenser portions of the heat transfer device.

Various types of commercial heat transfer devices are available, such as the heat pipes made by Thermacore,® Inc. in Lancaster, Pa. The heat transfer device 102 can further include separate condenser and evaporator sections that are thermally and/or fluidly coupled to each other via a pumping device, such as a wick. See, for example, U.S. Pat. No. 6,367, 263, supra.

The various embodiments of the present invention operate by diverting the normal flow of vapor in a heat transfer device to a vapor-pressurizing device and then into electricity producing components in order to produce electrical energy as described herein. Consequently, if commercial heat transfer devices are used, such as the Thermacore® heat pipes noted above, suitable modifications would need to be made.

In one embodiment, the heat transfer device 102 is a thermosyphon. In another embodiment, the heat transfer device 102 is a heat pipe. In a particular embodiment, the heat transfer device 102 is a vacuum chamber heat sink that can serve as a heat pipe or a thermosyphon. In such a device, the heat dissipating region typically includes heat dissipation elements such as fins or rods that provide large surface areas for spreading heat. The heat transfer device can be made from any suitable material. In one embodiment, the heat transfer device is made from copper or a copper-based material. The heat transfer device 102 can further include a fan, as is known in the art, which provides air movement to increase the amount of heat dissipated over time. The heat transfer device and/or each portion thereof, is thermally and/or fluidly coupled to other components in the system.

It is appreciated that virtually any mechanism can be used to cool the excess vapor exiting the turbine blades. In one embodiment, a conventional condenser arrangement, as described herein, is used to reliquify the vapor. In another embodiment, a separate energy source, such as the type of energy provided by a thermoelectric cooler, is used. (A thermoelectric cooler is capable of providing heating or cooling, depending on the polarity of its voltage.)

Any suitable type of fluid known in the art can be used. This includes, but is not limited to methanol, ammonia and acetone. Although water, e.g., deionized water, also has excellent thermal properties and is known to adequately cool heat sinks, it may be less efficient with regard to its ability to provide highly-pressurized forces to the turbine blades due to its relatively low vapor pressure, i.e., less than one (1) atm at operating temperature. In another embodiment, low-boiling point dielectric fluids are used, i.e., fluids that boil at less than about 40° C. Examples include, but are not limited to, hydrofluoroethers (HFE), chlorofluorocarbons (CFC), and so forth. Although low-boiling fluids may not provide as much cooling for the heat sink as fluids having a relatively low vapor pressure, the higher vapor pressure from such fluids, i.e., in excess of about three (3) atm at operating temperature, allows the turbines to operate more efficiently. Specifically, since the turbine blades spin faster with the increased pressure or force, more electrical energy is produced per given volume of fluid. In yet another embodiment, high-boiling dielectrics are used. The optimum fluid will ultimately depend on a specific application. In other embodiments, liquid metals such as sodium and potassium are used. Generally, the amount of fluid used herein is quite small, e.g., less than one (1) mL to about ten (10) mL.

Other components in the system, such as the compressor 104 and turbine generator 106 can also take any form. In one embodiment, any suitable type of device is used that is capable of performing the intended function. In another embodiment one or more of the components are MEMS devices, as defined herein. Each of the components are coupled in any suitable manner. In one embodiment, the components are fluidly and/or thermally and/or electrically and/or mechanically coupled, as those terms are understood in the art. In another embodiment, the turbine generator is replaced by two separate components, namely a turbine and a generator coupled together in any suitable manner.

In one embodiment, the compressor is a turbine compressor, screw compressor or centrifugal compressor, although the invention is not so limited. In another embodiment, the compressor is an acoustic compressor as described in U.S. Pat. No. 5,319,938, issued Jun. 14, 1994 and in U.S. Pat. No. 6,367,263, supra. It is appreciated that the compressor can be driven by any suitable means, such as with a piezoelectric device.

In one embodiment, the turbine or turbine portion of a turbine generator has high speed rotating blades, such as a micro radial inflow turbine. In another embodiment, the generator or generator portion of a turbine generator is a micro electrostatic starter generator.

It is understood that components integral to these devices, such as bearings, and so forth, need to be compatible with the micro device environment. In one embodiment, the bearings are electromagnetic, air, journal (e.g., cylindrical rotor, wave, foil, etc.), electric and so forth. Other design considerations include maintaining suitable Reynolds numbers, air pressure, shaft speed and so forth. Furthermore, the materials, including the electrical infrastructure used to conduct electricity from the turbine generator to the rechargeable energy storage device, will not be discussed in detail herein. Such design considerations are known to those skilled in the art.

For a discussion of MEMS technology, see, for example, A. H. Epstein, et al., *Shirtbutton-Sized Gas Turbines: The Engineering Challenges of Micro High Speed Rotating Machinery*, presented at the 8th Int'l Symposium on Transport Phenomena (hereinafter "Epstein") and Dynamics of Rotating Machinery (ISROMAC-8), Honolulu, Hi., March 2000 and A. H. Epstein, *Micro Turbine Engines for Soldier Power*, presented at "The Defense Science and Technology Seminar: Future Warrior Systems," October 2000.

Figure 2:
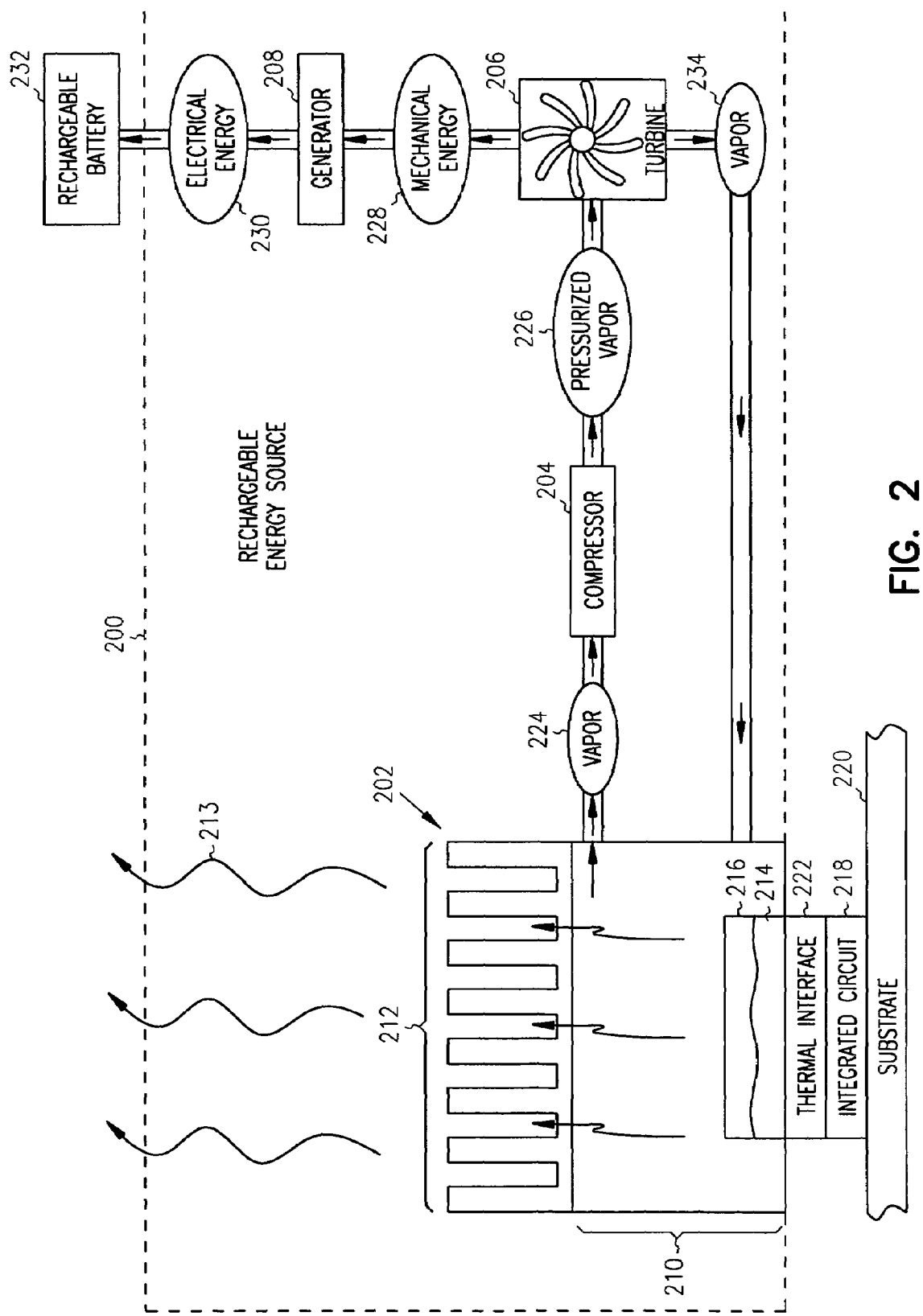
FIG. 2 is a simplified schematic of one embodiment of the electrical energy-generating heat sink system of FIG. 1.

FIG. 2 shows a simplified schematic of one embodiment of the electrical energy-generating heat sink system of FIG. 1. The electrical energy-generating system 200 in this embodiment includes a vapor chamber heat sink 202, a MEMS compressor 204, a MEMS turbine 206 and a MEMS generator 208. The vapor chamber heat sink 202 comprises a hollow vapor chamber base 210 and a plurality of fins or rods 212. The hollow vapor chamber base 210 includes a fluid 214 under pressure within a chamber 216. The vapor chamber heat sink 202 is used to conduct heat 213 away from a heat generating device, such as the integrated circuit package 218 shown mounted to a substrate 220 in FIG. 2.

It will be appreciated that the integrated circuit package 218 can contain any type of integrated circuit that produces heat. However, the present invention is particularly suited for processors used in the mobile environment that operate at high speeds and produce relatively large amounts of heat, such as about 30 watts or more over a temperature of about 100° C. The substrate 220 is any kind of carrier, such as a circuit board, a motherboard or a test board. In this embodiment, a layer of thermal interface material 222 is interposed between the integrated circuit 218 and the vapor chamber heat sink 202. The thickness of the layer of thermal interface material 222 is highly exaggerated for clarification. A thermal interface material is usually a thin layer of material that produces intimate, poreless thermal contact, e.g., typically less than about 0.1 mm in thickness.

In one embodiment, the vapor chamber heat sink embodiments shown herein are comparable to the heat sinks described in U.S. Pat. No. 6,639,799, supra, although there is not necessarily a wick structure in the present invention. In another embodiment, the vapor chamber heat sinks are comparable to the heat sinks described in "U.S. Pat. No. 6,367, 263," supra.

As shown in FIG. 2, the fluid 214 exits the heat sink 202 as a vapor 224. After passing through the compressor 204 the vapor emerges as pressurized vapor 226 that is propelled through the turbine 206 (or a turbine-portion of a turbine generator), producing mechanical energy 228 that is converted to electrical energy 230 in the generator 208. The electrical energy 230 then passes through appropriate electrical infrastructure to provide electricity to a rechargeable battery 232. Excess vapor 234 also exits the turbine 206 and is returned as a fluid to the heat sink 202 where the process begins again.

Figure 3:
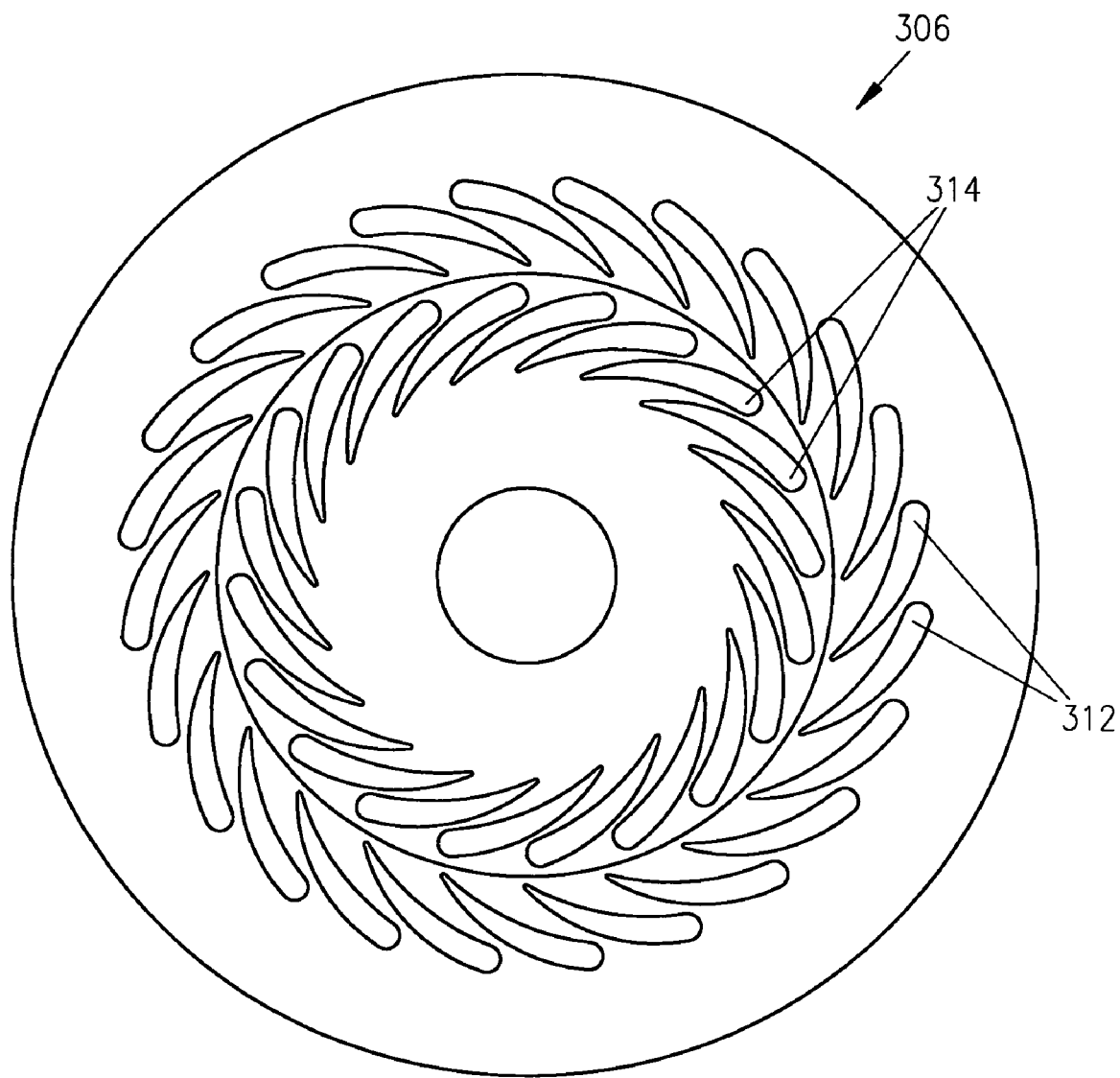
FIG. 3 is a perspective view of a portion of an exemplary turbine in the electrical energy-generating heat sink system of FIG. 2 in one embodiment of the present invention.

FIG. 3 shows one embodiment of a fan blade arrangement in a turbine 306. In this type of turbine, typically referred to as a micro radial inflow turbine, the shape, size, orientation, etc., of the inner row of rotor blades 312 and the outer row of stator blades 314 are designed according to the particular application. Considerations on design include airfoil height, centrifugal bending stress at the blade root, adequate support for radial loads, and so forth.

Figure 4:
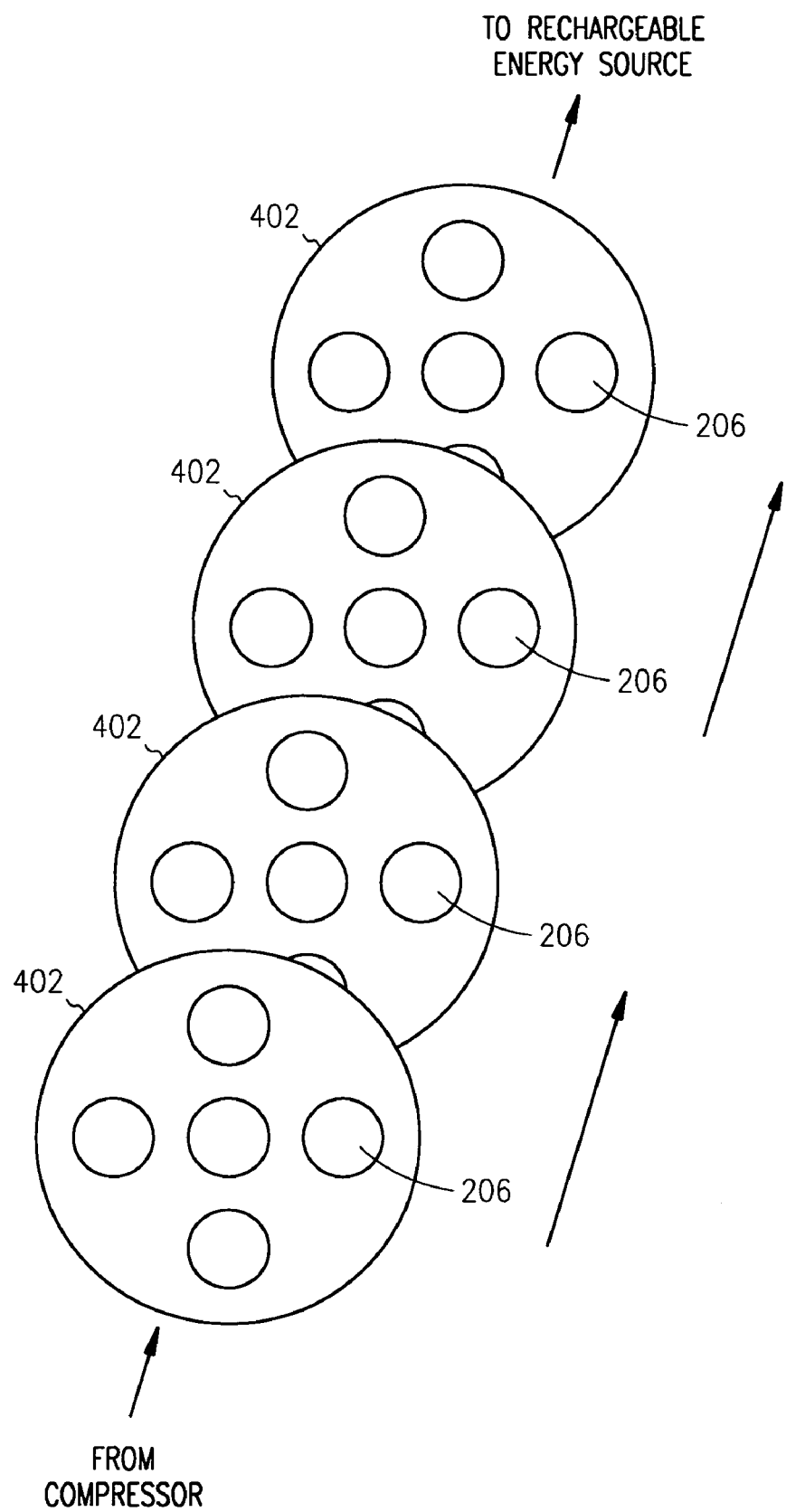
FIG. 4 is a simplified cross-sectional view of an exemplary turbine array in the electrical energy-generating heat sink system of FIG. 2 in one embodiment of the present invention.

FIG. 4 is a simplified illustration of one embodiment of a series of turbine plates 402, each containing five turbines 206, although the invention is not so limited. Any number of turbines 206 can be used as desired for a particular application in order to maximize the generation of electricity. The turbines 206 can be arranged in any manner, e.g., in series or parallel, although greater efficiency may be achieved by using a combination of both serial and parallel. In the embodiment shown in FIG. 4, the turbines 206 are arranged in parallel on each individual plate 402, with four plates 402 arranged in series with the connection exiting the compressor, although any number of turbine plates 402 can be used as desired. If the turbines are arranged only in parallel, this can cause each turbine to operate at a proportionately lower pressure, because the entering pressurized vapor is now split into multiple flow paths. The lower pressure reduces the rate at which the turbine blades spin, thus reducing energy production. Similarly, arranging the turbines in series may also reduce energy production, i.e., each time the vapor passes through a turbine, some "energy" is lost and less work can be done when it passes through the next turbine. The actual design that provides the greatest efficiency can be determined through testing of various combinations, types and numbers of turbines, given the space constraints of a given electronic device.

Figure 5:
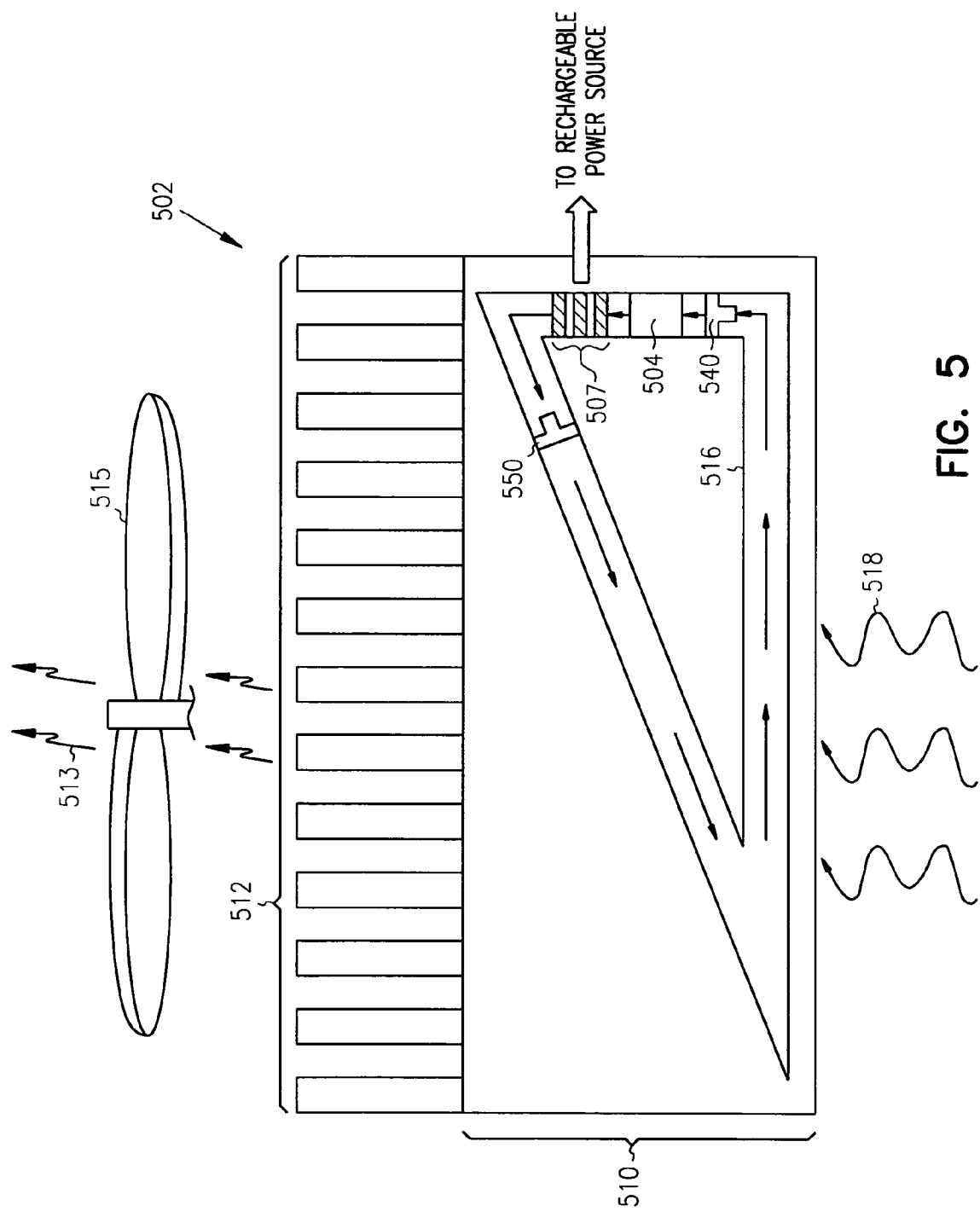
FIG. 5 is an illustration of another embodiment of the electrical energy-generating heat sink system of FIG. 1.

FIG. 5 is a simplified schematic view of an alternative vapor chamber heat sink 502. In this embodiment the vapor chamber heat sink 502 comprises a vapor chamber base 510 and a plurality of fins or rods 512. In the embodiment shown, a fan 515 located above the heat sink 502 assists in removing heat 513, although the invention is not so limited. The hollow vapor chamber base 510 includes a fluid under pressure within a substantially triangular chamber 516. The fluid passes through a compressor 504 and an array of turbine-generators 507 located within the chamber 516. The electrical energy produced is directed to the rechargeable energy storage device. One-way valves 540 and 550 ensure that the flow of fluid is as desired within the chamber 516.

The triangular-shaped chamber 516 shown in FIG. 5 has the advantage of using gravity to return the fluid back to the lower portion of the chamber. In another embodiment, any suitable geometry can be used that provides the requisite incline. In yet another embodiment, the chamber 516 is oriented in any direction and fluid movement is provided and/or assisted by other pumping means, such as with a wick.

Figure 6:
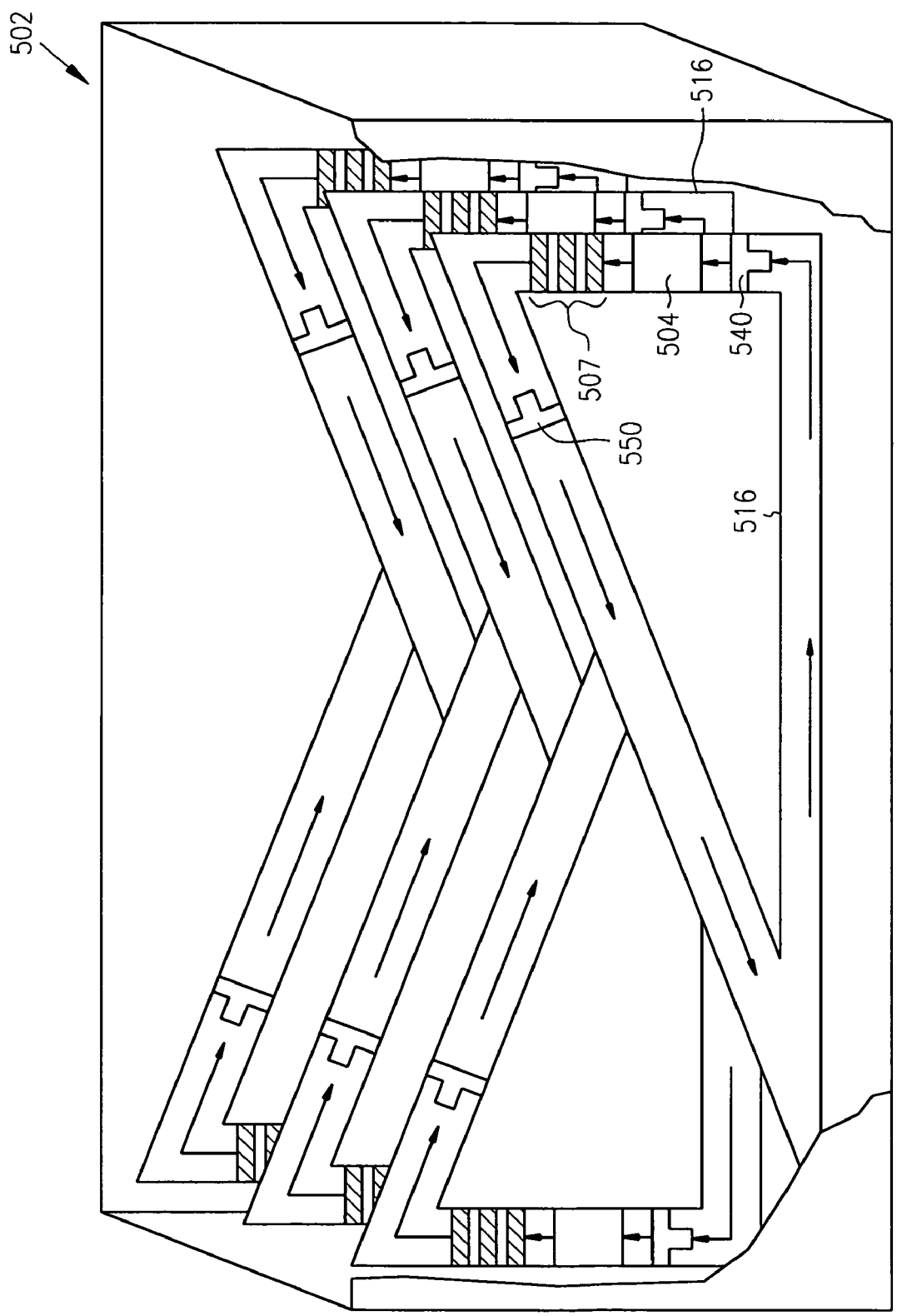
FIG. 6 is a simplified perspective view of the vapor chamber base of FIG. 5 in one embodiment of the present invention.

FIG. 6 is a simplified perspective view of the vapor chamber base 510 of FIG. 5. As can be seen, multiple chambers 516 can be used to increase the efficiency and output of the electrical energy-generating system. The chambers 516 in FIG. 6 alternate in orientation, although the invention is not so limited. Such an arrangement, however, is likely to reduce or eliminate hot spots within the heat sink, as the heat is being directed in alternating directions.

Figure 7:
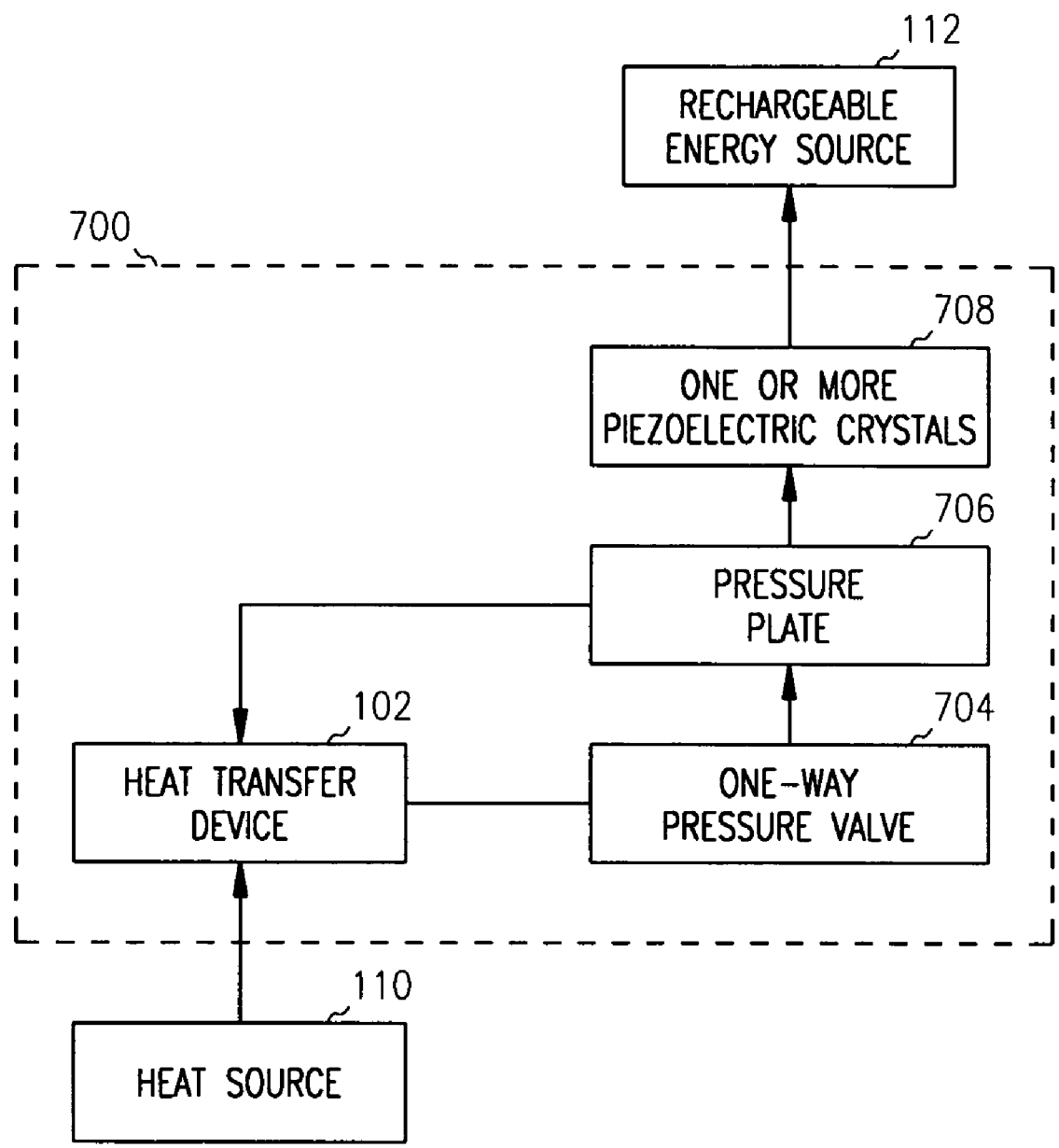
FIG. 7 is a block diagram describing an alternative electrical energy-generating heat sink system in embodiments of the present invention.

FIG. 7 shows a simplified block diagram of an alternative electrical energy-generating system 700. In this embodiment, the electrical energy-generating system 700 includes the heat transfer device 102 as shown in FIG. 1. However, the vapor-pressurizing device in the embodiment in FIG. 7 is a one-way pressure valve 704, although it is also possible to use the type of compressor (104) described in FIGS. 1 and 2 (which can include a MEMS compressor) as the vapor-pressurizing device, again coupled to or contained within the heat transfer device 102. In one embodiment, two or more one-way pressure valves (See 404 in FIG. 4) or two or more compressors (See 104 in FIG. 1) are used as the vapor-pressurizing device. The electricity-generating device in this embodiment comprises a pressure plate 706 adapted to mechanically contact one or more piezoelectric crystals 708 when exposed to a sufficiently high vapor pressure, the electricity-generating device coupled to or contained within the heat transfer device. As with the embodiment shown in FIG. 1, a working fluid present in the heat transfer device 102 is converted to vapor by the heat source, such as a microprocessor. The vapor is pressurized as it passes through the one-way pressure valve 704 (or compressor). Once the pressure of the vapor is sufficiently high, the pressurized vapor in contact with a bottom surface of the pressure plate 706 begins to cause one or more spikes on a top surface of the pressure plate 706 to make contact with the one or more piezoelectric crystals 708. As a result, the crystals mechanically deform, thus generating electrical energy which is provided to the rechargeable energy source as described herein. In some embodiments, the pressure may continue to increase even after the pressure plate 706 begins to move upwardly, although the invention is not so limited. At some point, however, a predetermined maximum vapor pressure is reached (corresponding with a maximum deformation of the one or more piezoelectric crystals), after which, the vapor pressure begins to decrease down to a sufficiently low level to allow the vapor to pass through a cooling or re-liquifying device (e.g., a second one-way valve or a condenser) where it is reliquified prior to re-entering the fluid-containing portion of the heat transfer device 102, so that it can be used again in the electrical energy-generating system 700. In some embodiments, the pressure may continue to decrease even after the vapor begins to move through the cooling device, reaching a predetermined minimum pressure, although the invention is not so limited.

Figure 8:
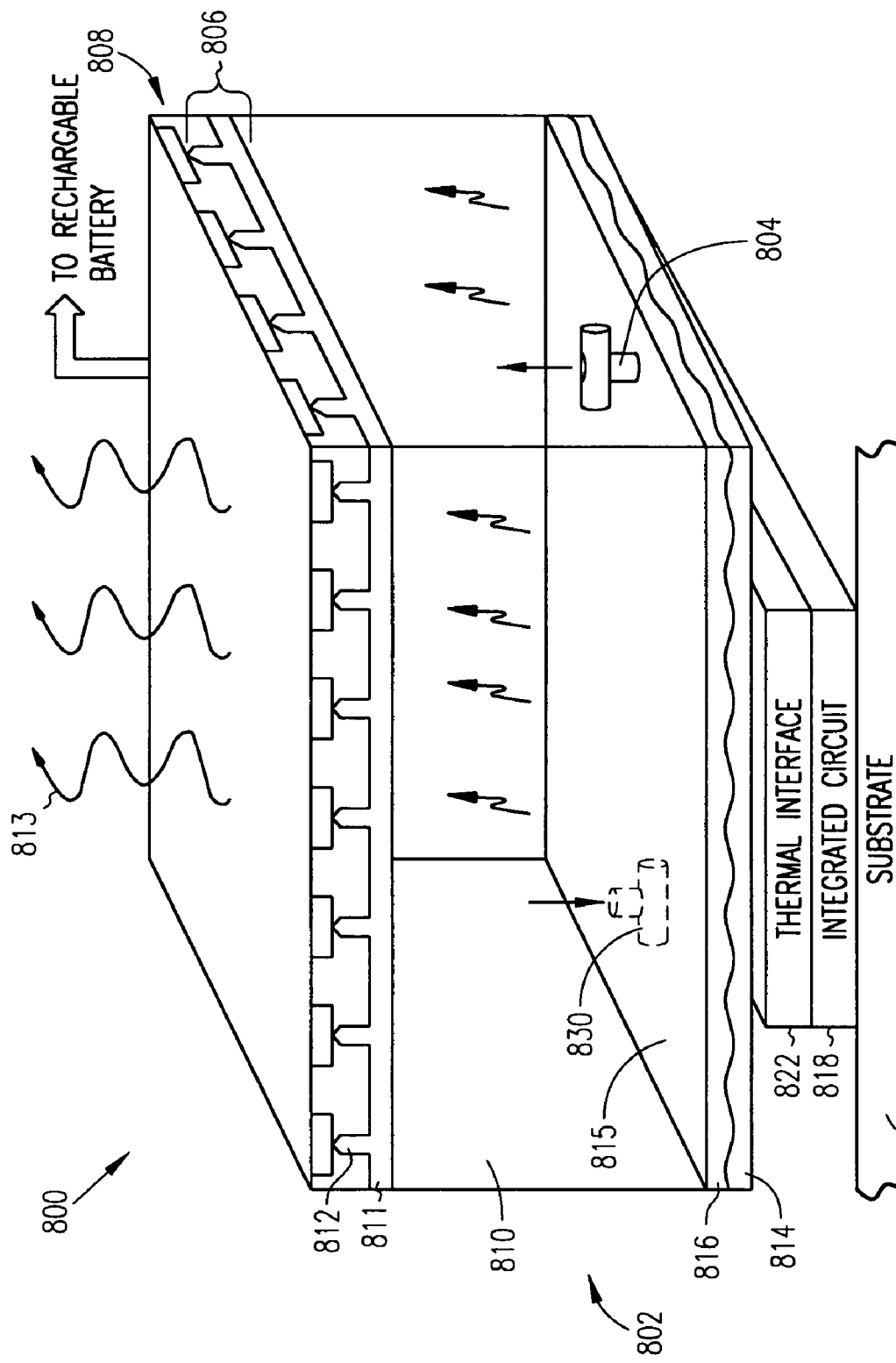
FIG. 8 is a simplified perspective view of one embodiment of the electrical energy-generating heat sink system of FIG. 7.

FIG. 8 shows a simplified perspective view of one embodiment of the alternative electrical energy-generating heat sink system of FIG. 7. The electrical energy-generating system 800 in this embodiment includes a vapor chamber heat sink 802 with a vapor chamber 810 and a fluid 814 under pressure within a fluid chamber 816. (The vapor chamber heat sink 802 can optionally further include a wick (not shown) as is known in the art). A top surface 815 of the fluid chamber 816 serves as a rigid divider between the two chambers. The vapor chamber heat sink 802 is used to conduct heat 813 away from a heat generating device, such as the integrated circuit package 818 shown mounted to a substrate 820, similar to FIG. 2. Fins or rods and/or a fan (not shown) can also be used to aid in heat removal as is known in the art. In one embodiment, the temperature of the heat generating device is between about 70 and 100° C.

In this embodiment, the vapor-pressurizing device is a first one-way pressure valve 804 (although again, it is also possible to use any type of compressor described herein in this alternative embodiment). The electricity-generating device in this embodiment is a pressure plate 806 capable of mechanically contacting a plurality of piezoelectric crystals 808 when exposed to a sufficiently high vapor pressure, although the invention is not so limited. In one embodiment, the plurality of piezoelectric crystals 808 are arranged in any configuration such as any type of array. Again, in other embodiments, a single crystal is used. Once the pressure of the vapor drops to a predetermined level, a second one-way pressure valve 830 then fluidizes the vapor prior to entering the fluid chamber 816 where it is used again in the system. In an alternative embodiment, any type of condenser, including a MEMS condenser, is used in place of the second one-way pressure valve 830.

The actual sufficiently high and sufficiently low vapor pressures utilized in the system will vary depending on many factors, including the temperature of the heat source 110, the type of working fluid being used, the weight of the pressure plate 706, and so forth. In most embodiments, as the heat source 110 heats up, the working fluid in the fluid chamber 816 begins to vaporize, thus leading to an increase in pressure in the fluid chamber 816. Once the pressure reaches a pre-determined sufficiently high level, the first one-way pressure valve 804 opens up and releases vapor under pressure into the vapor chamber 810. As the pressure in the vapor chamber 810 increases, at some point, the pressure plate 806 moves up to contact the plurality of piezoelectric crystals 808. Once the pressure decreases to a pre-determined sufficiently low level, the second one-way pressure valve 830 opens up and releases the vapor back into the fluid chamber 816, where the process begins again. The sufficiently high and low vapor pressures lie within a specific range of operating pressures which are necessarily above equilibrium, i.e., above an "equilibrium pressure." (The equilibrium pressure is the pressure of the system under ambient conditions). In one embodiment, the operating pressure is between about 10 and 30 psi (about 0.7 to 2.1 k/cm$^2$).

As with the electrical energy-generating system 100 described above, each component of the electrical energy-generating system 800 can take on any configuration, as long as the system fits together properly to perform the intended function. Therefore, any of the heat transfer devices described herein can also be used in this embodiment. However, as noted above, heat transfer device designs vary, and the various embodiments of the present invention are not limited to any specific design, although space constraints in certain environments, such as the mobile environments, certainly can influence the final design. Again, if commercial heat transfer devices are used, modifications would need to be made. It should also be appreciated that any of the working fluids described herein can also be used in this embodiment.

In the embodiment shown in FIG. 8, the pressure plate 806 is comprised of a base portion 811 and an array of spikes 812 having a height approximately two times the height (i.e., thickness) of the base portion 811, although the invention is not so limited. In one embodiment, the spikes 812 are more than about two times the height of the base portion 811. In another embodiment, the spikes 812 are less than about two times the height of the base portion 811, down to about one-half the height of the base portion 811. The spikes can be arranged in any suitable configuration and any suitable number of spikes can be used. In one embodiment, only a single spike is used. In yet other embodiments, the spikes are replaced with components having alternative geometries, such as rounded bumps and the like, having any suitable height.

In another alternative embodiment, the pressure plate 806 is comprised of only a base portion 811. The base portion 811 can also be any suitable size and shape. In one embodiment, the base portion is square-shaped or rectangular-shaped. In an exemplary embodiment, the base portion 811 is about two (2) to four (4) in. (about 5.1 to 10.2 cm) in length and width and about 0.125 to 0.25 in. (about 0.3 to 0.6 cm) in height.

The actual number and arrangement of spikes in the array of spikes 812 depends on the number and arrangement of crystals in the plurality of piezoelectric crystals 808. In one embodiment, there is at least one spike for each crystal. In other embodiments, any suitable number of spikes can be used. In one embodiment, a single spike is used.

Figure 9:
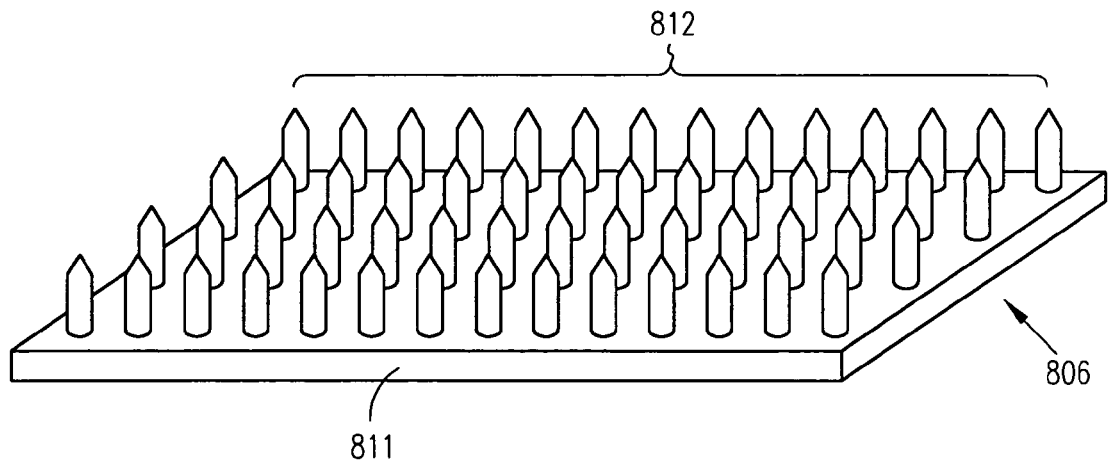
FIG. 9 is a simplified perspective view of a pressure plate present in the alternative electrical energy-generating heat sink system of FIG. 8 in one embodiment of the present invention.

The spikes can be arranged in any suitable manner and do not necessarily form an array. FIG. 9 shows a perspective view of one embodiment of the pressure plate 806 containing the base portion 811 and an array of spikes 812. The amount of deformation each crystal experiences is dependent on many factors, including the vapor pressure, type of crystal, size and configuration of the spikes, and so forth. In one embodiment, the pressure plate 806 is positioned a minimum distance from the plurality of piezoelectric crystals 808 so that minimum movement is required before contact with the crystals 808 is made. In one embodiment, the pressure plate 806 travels a distance of less than about 500 microns before causing mechanical deformation of the plurality of piezoelectric crystals 808.

The material used for the pressure plate 806 should be able to withstand the temperatures of operation and further be chemically resistant to the liquid/vapor being used in the closed loop system. The material further needs to have a coefficient of thermal expansion similar to the coefficient of expansion for the heat transfer device 802 to prevent the components from expanding and contracting at substantially different rates, thus preventing proper movement of the pressure plate 806. In one embodiment, the pressure plate 806 is made of a lightweight material such as plastic, any suitable lightweight metal (e.g., aluminum, etc.) and the like. The use of a lightweight material minimizes the pressure required to cause the pressure plate 806 to respond. In one embodiment, the pressure plate 806 weighs less than about 200 grams. In most embodiments the material used for both the base portion 811 and the array of spikes 812 is the same, although the invention is not so limited. In one embodiment the base portion 811 and array of spikes 812 are integral with each other. In an alternative embodiment, the base portion 811 and array of spikes 812 are manufactured separately and later joined together in any suitable manner.

Referring again to FIG. 8, each piezoelectric crystal used in the plurality of piezoelectric crystals 808 can be any type of piezoelectric crystal having a variety of shapes and sizes, although each crystal should have the necessary properties to be able to convert mechanical energy into electrical energy. In most embodiments, each crystal is as thin as possible to minimize the size of the heat sink, although the size of each crystal in the plurality of piezoelectric crystals 808 is ultimately dependent on the manufacturing process used to prepare and secure it into place on an inner surface of the heat transfer device 802. In one embodiment, each crystal is cut using standard manufacturing processes and glued into place on the uppermost inner surface of the heat transfer device 802. In one embodiment, chemical vapor deposition is used to lay down a thin, uniform layer of crystals across the entire surface. In another embodiment, physical vapor deposition is used. In one embodiment the piezoelectric crystals are made from quartz.

Figure 10:
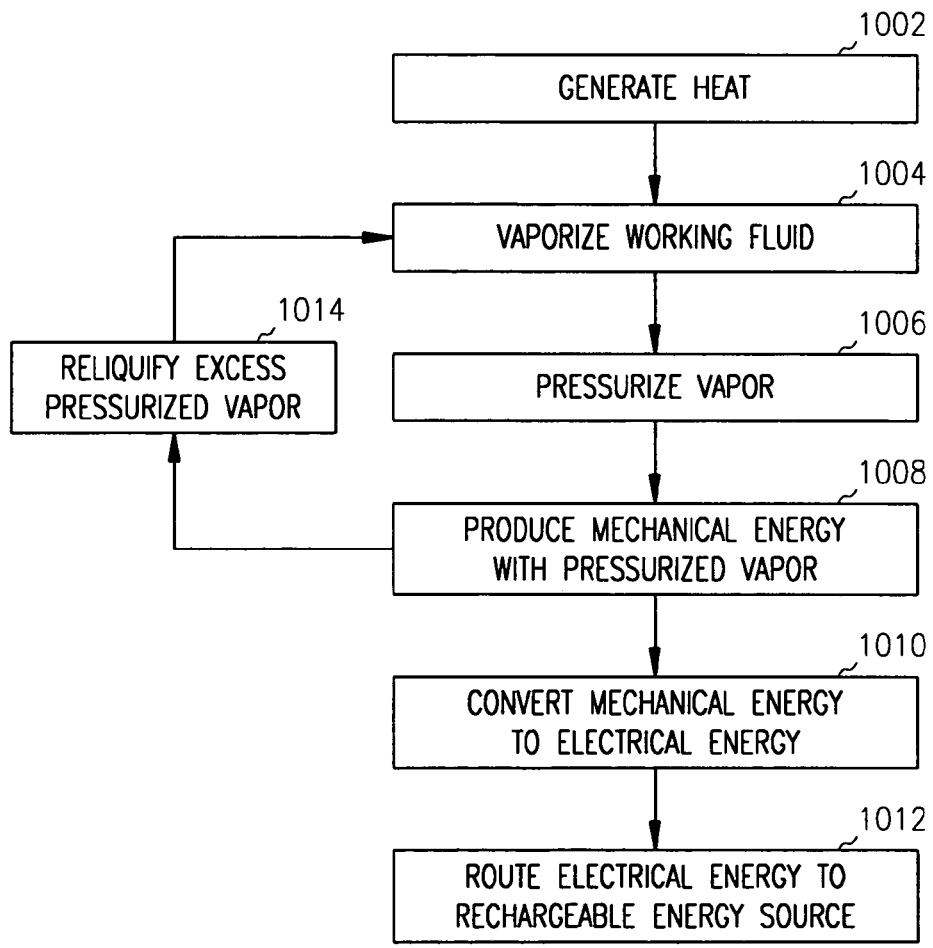
FIG. 10 is a block diagram of a method for providing electrical energy to a rechargeable energy storage device with the system of FIG. 1 or 7 in embodiments of the present invention.

FIG. 10 is a block diagram describing a method for recharging an energy storage device in embodiments of the present invention. The initial step 1002 generates heat with a heat generating device. The heat vaporizes 1004 a working fluid in thermal contact with the heat generating device. This vapor is then pressurized 1006 by a vapor-pressurizing device (e.g., compressor or one-way pressure valve) and either forced through turbine blades or under a pressure plate to produce 1008 mechanical energy. A generator (or alternator) or a plurality of piezoelectric crystals converts 1010 the mechanical energy to electrical energy, which is then routed 1012 to the rechargeable energy storage device. Excess vapor in step 1008 is reliquified 1014 with a condenser or one-way pressure valve for use again as a working fluid.

The various embodiments of the electrical energy-generating system described herein can be designed to efficiently and economically extend the usage of any type of device that generates heat and requires an energy source. This includes, but is not limited to mobile devices such as computers, digital assistants, cell phones, global positioning system receivers, robots, electrical vehicles, cell phones and so forth. However, devices which are run only intermittently, such as cell phones that are cycled on and off, may not benefit fully from the electrical energy-generating features of the present invention, as the necessary heat that fuels the process would only be generated during the short periods while the unit is being operated. In one embodiment, an electrical energy-generating system, in combination with a suitable battery or battery pack, is used as a back-up generator for heat-generating devices routinely connected to the power grid, such as desktop processors (e.g., in which 50 to 500 watts of power is generated over a temperature of about 100° C.), refrigerators, high-speed modems, and so forth. In another embodiment, an electrical energy-generating system, in combination with a suitable battery system, is utilized as the primary energy source for devices where access to the power grid is impractical and/or not desirable for environmental and/or economic reasons, thus providing mobility for users of devices in remote locations.

It is estimated that as much as five (5) to six (6) Watt-hours of electrical energy can be provided to a rechargeable energy storage device, such as a notebook battery, with the electrical energy-generating system described herein, assuming about ten (10)% efficiency. In other embodiments, electrical energy in excess of five (5) to six (6) Watt-hours is provided to the rechargeable electrical source. In yet other embodiments, the efficiency is greater than about ten (10)%.

With regard to notebook computers, it is known that run time varies from computer to computer, based on the applications being used (i.e. high graphics, games), the number of times something is saved or retrieved from the hard drive and/or CD Rom drive, the memory of notebook, the chemistry and capacity of the battery, and so forth. A realistic average run-time for a conventional battery is 1.5 to three (3) hours. The ability of the electrical energy-generating heat sinks described herein to serve as a battery charger in a notebook computer can likely increase run-time by at least five (5) to ten (10) % or more. In yet other embodiments, run-time may be unlimited, comparable to using a conventional power-grid source.

Figure 11:
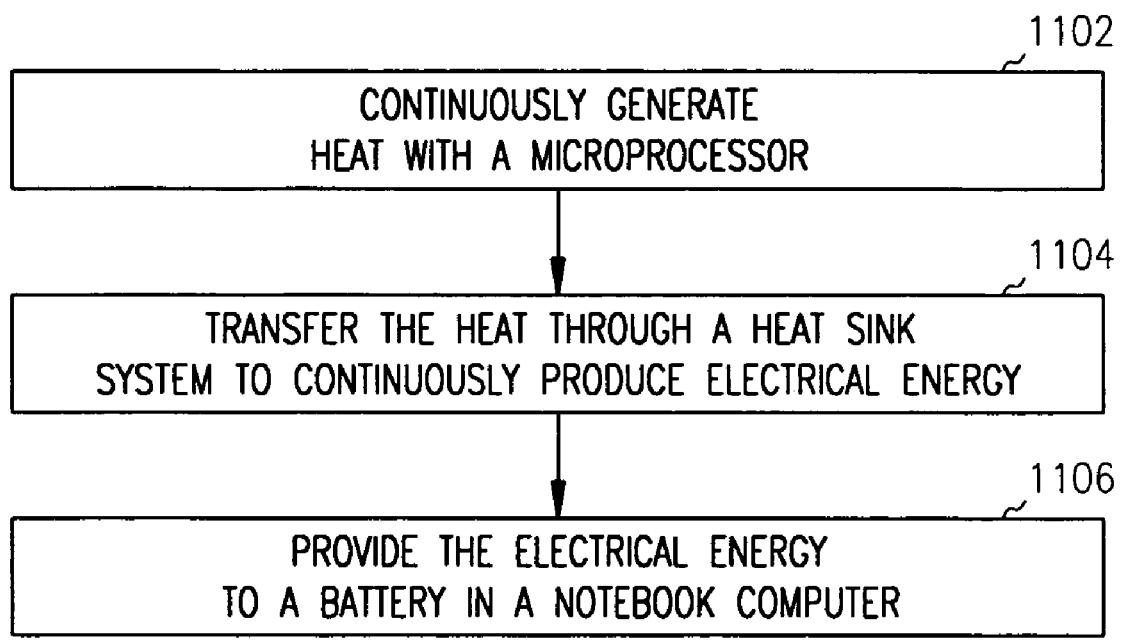
FIG. 11 is a block diagram of a method for extending run-time for a battery-operated notebook computer with the system of FIG. 1 or 7 in embodiments of the present invention.

FIG. 11 is a block diagram of a method for extending run-time for a battery-operated notebook computer comprising continuously generating heat 1102 with a microprocessor; transferring 1104 the heat through a heat sink to continuously produce electrical energy, the heat sink including a vapor-pressurizing device such as a compressor or one-way pressure valve and either a turbine generator or a pressure plate/piezoelectric crystal device; continuously providing the electrical energy to a battery 1106 in the notebook computer to recharge the battery, wherein run-time is extended for the notebook computer.

Batteries used in portable computing equipment typically last between 12 to 18 months, although the life of a battery is more accurately measured in charge/discharge cycles. Nickel metal hydride and lithium iodine batteries typically average about 500+ cycles. It is possible that the in situ continuous recharging device described herein may actually extend battery life since the battery is constantly being recharged during use, experiencing fewer cycles. Appropriate tests under suitable conditions can be performed to determine the extent of this possible advantage. The energy efficiency of the rechargeable battery may also be improved, i.e., the percentage of electrical energy stored in a rechargeable battery that is recoverable during discharging. However, as noted herein, this percentage is dependent on several factors, including current efficiency, heat losses, and so forth.

It is also possible that the electrical energy-generating systems described herein can be modified to assist with the problem of self-discharging that occurs when a battery remains for extended periods in an unused electronic device, i.e., installation of a secondary generator system that functions when the processor is not operating to keep the battery fully charged. Currently, if an electronic device having a rechargeable battery, such as a notebook computer, is left plugged into the power grid, the battery may over-heat, causing the battery cells to slowly deteriorate over time. Use of a MEMS-based generator designed to be operational during non-use can likely be more closely controlled and limited in order to avoid over-heating of the battery.

The electrical energy-generating systems described herein further reduce or eliminate the overheating problems inherent with batteries in many electronic devices, particularly portable electronic devices. Overheating can lead to failure of other components, causing expensive repairs or even replacement of the entire unit. Furthermore, unlike recharging means that require removal of the batteries for placement in a separate charger, the recharging means described herein provides convenient and continuous recharging during use, without the operator needing to take any additional steps. By virtually eliminating reliance on the conventional power grid, the various embodiments of the electrical energy-generating system described herein are energy efficient and environmentally-friendly.

Use of a vapor chamber heat sink has the further advantage of alleviating the problem of thermal spreading resistance, which can result in hot spots developing directly over the processor. Vapor chamber heat sinks are generally known to be smaller and lighter than traditional heat sinks. Additionally, the cooling fins are likely to be more efficient because they are all at or near the same temperature.

Although specific embodiments have been illustrated and described herein, it will be appreciated by those of ordinary skill in the art that any arrangement which is calculated to achieve the same purpose may be substituted for the specific embodiment shown. For example, the refrigeration system described herein might be replaced by a suitably-designed magnetic refrigeration system, thus eliminating the need for a fluid-based heat pipe. This application is intended to cover any adaptations or variations of the present invention. Therefore, it is manifestly intended that this invention be limited only by the claims and the equivalents thereof.

What is claimed is:

1. An electrical energy-generating system comprising:
   a heat transfer device responsive to heat generated by a microprocessor;
   a vapor-pressurizing device thermally coupled to the heat transfer device; and
   an electricity-generating device thermally coupled to the vapor-pressurizing device, the electricity-generating device comprising a pressure plate and one or more piezoelectric crystals, the pressure plate adapted to contact the one or more piezoelectric crystals when exposed to a sufficiently high vapor pressure.

2. The electrical energy-generating system of claim 1 wherein the electricity-generating device is contained within the heat transfer device.

3. The electrical energy-generating system of claim 2 wherein the heat transfer device contains a working fluid.

4. The electrical energy-generating system of claim 3 wherein the working fluid is a dielectric.

5. The electrical energy-generating system of claim 4 wherein the dielectric is a hydrofluoroether or chlorofluorocarbon.

6. The electrical energy-generating system of claim 4 wherein the working fluid is selected from the group consisting of deionized water, ammonia, acetone and methanol.

7. The electrical energy-generating system of claim 1 wherein the vapor-pressurizing device is a compressor or a one-way pressure valve.

8. The electrical energy-generating system of claim 1 wherein the pressure plate comprises a base portion having a top surface and a bottom surface, the top surface having one or more spikes located thereon for contacting the one or more piezoelectric crystals, the bottom surface oriented for exposure to the sufficiently high vapor pressure.

9. The electrical energy-generating system of claim 8 wherein the pressure plate is made from aluminum or plastic.

10. The electrical energy-generating system of claim 1 wherein each of the one or more piezoelectric crystals is a quartz crystal.

11. The electrical energy-generating system of claim 1 wherein the one or more piezoelectric crystals are secured in place using physical vapor deposition or chemical vapor deposition.

12. The electrical energy-generating system of claim 1 wherein the sufficiently high vapor pressure is between 10 and 30 psi above equilibrium.

13. The electrical energy-generating system of claim 12 further comprising a cooling device, wherein vapor enters the cooling device when it reaches a sufficiently low vapor pressure.

14. The electrical energy-generating system of claim 13 wherein the sufficiently low vapor pressure is between 10 and 30 psi above equilibrium.

15. The electrical energy-generating system of claim 8 wherein the pressure plate moves a total distance of less than about 500 microns during exposure to the sufficiently high vapor pressure.

16. The electrical energy-generating system of claim 15 wherein each of the one or more piezoelectric crystals deforms when contacted by the one or more spikes.

17. The electrical energy-generating system of claim 2 wherein the heat transfer device is a heat pipe or thermosyphon.

18. The electrical energy-generating system of claim 17 wherein the heat transfer device is a vapor chamber heat sink.

19. The electrical energy-generating system of claim 18 wherein the vapor chamber heat sink contains separate evaporator and condenser sections fluidly coupled together.

20. The electrical energy-generating system of claim 18 wherein the vapor chamber heat sink is a heat pipe having a wick.

21. The electrical energy-generating system of claim 18 wherein the vapor chamber heat sink comprises a hollow vapor chamber base coupled to a plurality of fins.

22. The electrical energy-generating system of claim 21 further comprising a chamber contained within the hollow vapor chamber base, the chamber adapted to house the electricity-generating device.

23. The electrical energy-generating system of claim 22 wherein electricity generated by the electricity-generating device is routed to a rechargeable energy storage device.

24. The electrical energy-generating system of claim 23 wherein the rechargeable energy storage device is a battery.

25. The electrical energy-generating system of claim 1 wherein the vapor-pressurizing device and electricity-generating device are micro-electrical mechanical systems (MEMS) devices.

26. An electrical energy-generating heat sink system comprising:
a vapor chamber heat sink containing a working fluid;
a vapor-pressurizing device fluidly coupled to the vapor chamber heat sink;
one or more piezoelectric crystals in contact with the vapor chamber heat sink; and
an electricity-generating device thermally coupled to the vapor-pressurizing device, the electricity-generating device comprising a pressure plate adapted to contact the one or more piezoelectric crystals when exposed to a sufficiently high vapor pressure and configured to provide electrical energy to a rechargeable battery in an electronic device.

27. The electrical energy-generating heat sink system of claim 26 wherein the electronic device is a notebook computer.

28. The electrical energy-generating heat sink system of claim 27 wherein the system increases run-time of the rechargeable battery in the notebook computer by at least ten percent.

29. An integrated circuit package comprising:
a heat transfer device having an integrated circuit mating surface;
a vapor-pressurizing device coupled to the heat transfer device; and
an electricity-generating device coupled to the vapor-pressurizing device, the electricity-generating device comprising a pressure plate and one or more piezoelectric crystals, the pressure plate adapted to contact the one or more piezoelectric crystals when exposed to a sufficiently high vapor pressure.

30. The integrated circuit package of claim 29 further comprising a cooling device coupled to the electricity-generating device and to the heat transfer device, the cooling device configured to cool excess vapor from the electricity-generating device for use again in the heat transfer device.

31. The integrated circuit package of claim 30 wherein the cooling device is a thermoelectric cooler, a condenser or a one-way pressure valve.

32. The integrated circuit package of claim 30 wherein the cooling device is integral with the heat generating device, further wherein the heat generating device is a vapor chamber heat sink.

33. The integrated circuit package of claim 32 further comprising a fan thermally coupled to the vapor chamber heat sink.

34. The integrated circuit package of claim 29 further comprising an integrated circuit die thermally coupled to the integrated circuit mating surface of the heat transfer device.

35. A notebook computer comprising:
a rechargeable battery; and
an electrical energy-producing heat sink system coupled to the rechargeable battery, the electrical energy-producing heat sink system comprising a pressure plate and one or more piezoelectric crystals, wherein the pressure plate is thermally coupled to a vapor pressurizing device and adapted to contact the one or more piezoelectric crystals when exposed to a sufficiently high vapor pressure produced by the vapor pressurizing device.

36. The notebook computer of claim 35 further wherein the pressure plate comprises a base portion having a top surface and a bottom surface, the top surface having an array of spikes located thereon for contacting the one or more piezoelectric crystals, the bottom surface oriented for exposure to the sufficiently high vapor pressure.

37. The notebook computer of claim 36 wherein the system increases run-time for the notebook computer by at least ten percent.

38. A battery charger comprising:
a vapor-producing device;
a vapor-pressurizing device thermally coupled to the vapor-producing device, wherein the vapor-producing device is adapted to intake heat from an integrated circuit package and expel vapor to the vapor-pressurizing device;
a mechanical energy-producing device mechanically coupled to the vapor-pressurizing device;
an electrical energy-producing device mechanically coupled to the mechanical energy-producing device, the electrical energy-producing device comprising a pressure plate and one or more piezoelectric crystals, the pressure plate adapted to contact the one or more piezoelectric crystals when exposed to a sufficiently high vapor pressure; and
a current supplying device electrically connected to the electrical energy-producing device and to a battery.

39. The battery charger of claim 38 wherein the vapor producing device is a vapor chamber heat sink.

40. The battery charger of claim 38 further comprising a vapor reliquifying device coupled to the vapor-pressurizing device.

41. The battery charger of claim 38 wherein the current supplying device is an electrical wire.

42. A method for providing electrical energy to a rechargeable energy storage device comprising:
vaporizing a working fluid in thermal contact with a heat generating device to produce vapor;
pressurizing the vaporized fluid to produce pressurized vapor;
contacting a bottom surface of a pressure plate with the pressurized vapor to produce mechanical energy; and
converting the mechanical energy to electrical energy with one or more piezoelectric crystals.

43. The method of claim 42 further comprising routing the electrical energy to the rechargeable energy storage device.

44. The method of claim 43 further comprising reliquifying excess pressurized vapor.

45. The method of claim 44 wherein the energy storage device is located in an electronic device.

46. The method of claim 45 wherein the electronic device is a notebook computer.

47. A method for extending run-time for a battery-operated notebook computer comprising:
- generating heat with a microprocessor;
- transferring the heat through a heat sink to continuously produce electrical energy, the heat sink including a pressure plate and one or more piezoelectric crystals, wherein the pressure plate is adapted to contact the one or more piezoelectric crystals when exposed to a sufficiently high vapor pressure; and
- providing the electrical energy to a battery in the notebook computer to recharge the battery, wherein run-time of the notebook computer is extended.

48. The method of claim 47 wherein run-time is extended by at least ten percent.

49. The method of claim 47 comprising continuously extending run-time while the battery-operated notebook is turned on.

50. The electrical energy-generating heat sink system of claim 26 wherein the pressure plate comprises a base portion having a top surface and a bottom surface, the top surface having one or more spikes located thereon for contacting the one or more piezoelectric crystals, the bottom surface oriented for exposure to the sufficiently high vapor pressure.

51. The electrical energy-generating heat sink system of claim 50 wherein each of the one or more piezoelectric crystals is a quartz crystal.

* * * * *